(12) United States Patent
Tsunoda

(10) Patent No.: US 8,630,369 B2
(45) Date of Patent: Jan. 14, 2014

(54) EMPHASIS CIRCUIT AND TRANSMITTER

(75) Inventor: Yukito Tsunoda, Isehara (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/609,562

(22) Filed: Sep. 11, 2012

(65) Prior Publication Data

US 2013/0170580 A1    Jul. 4, 2013

(30) Foreign Application Priority Data

Dec. 28, 2011    (JP) .................................. 2011-289708

(51) Int. Cl.
  *H04L 25/03* (2006.01)
  *H04L 25/49* (2006.01)
(52) U.S. Cl.
  USPC ..................... 375/296; 455/114.2; 455/114.3; 398/193
(58) Field of Classification Search
  USPC ............. 375/296, 297; 455/114.2–3; 398/193
  See application file for complete search history.

(56) References Cited

U.S. PATENT DOCUMENTS 8,248,135 B2 * 8/2012 Yu et al. ......................... 327/274
2002/0153950 A1 * 10/2002 Kusunoki et al. ............. 330/149

FOREIGN PATENT DOCUMENTS

JP    2004-88693    3/2004

OTHER PUBLICATIONS

Stefan Andersson et al., "A tuned, inductorless, recursive filter LNA in CMOS", ESSCIRC 2002 pp. 351-354.

* cited by examiner

*Primary Examiner* — Curtis Odom
(74) *Attorney, Agent, or Firm* — Staas & Halsey LLP

(57) ABSTRACT

An emphasis circuit includes: an applying circuit to add an emphasis signal to an input differential signal; a feedback path to feed back a differential output of the applying unit; a comparing circuit to compare a direct current component level of a positive phase signal and of a negative phase signal of the differential signal; a direct current component level controlling circuit to control a direct current component level of at least one of the positive phase signal and the negative phase signal; a delay unit circuit to add a delay to at least one of the fed-backed differential signal to generate the emphasis signal and inputs the emphasis signal into the applying unit; and a dummy load coupled to a positive phase signal output or a negative phase signal output of the applying unit.

14 Claims, 25 Drawing Sheets

SIGE DIODE (SINGLE)

SIGE DIODE (DOUBLE)

GAAS VCSEL

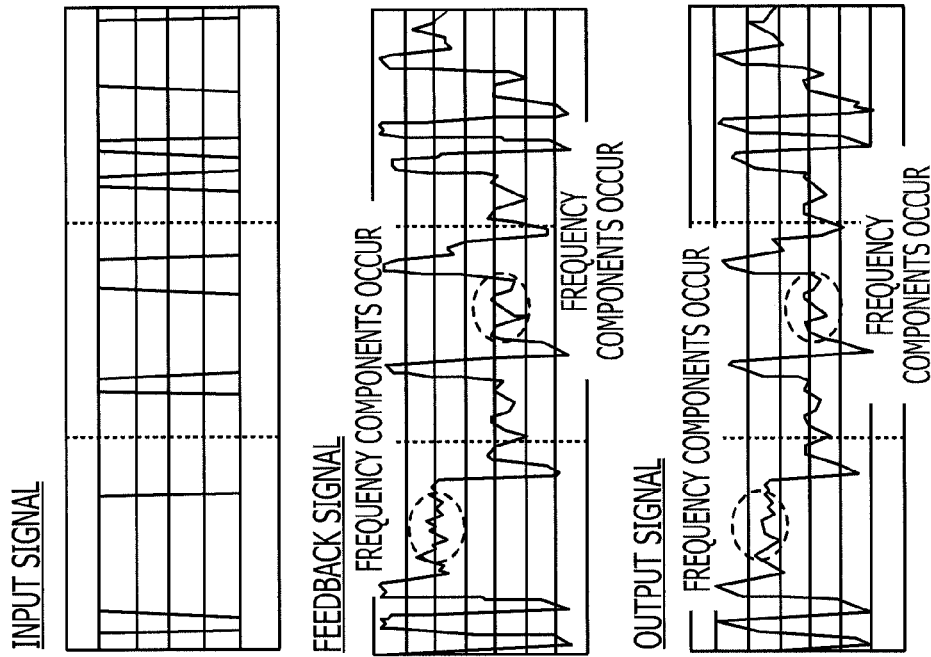
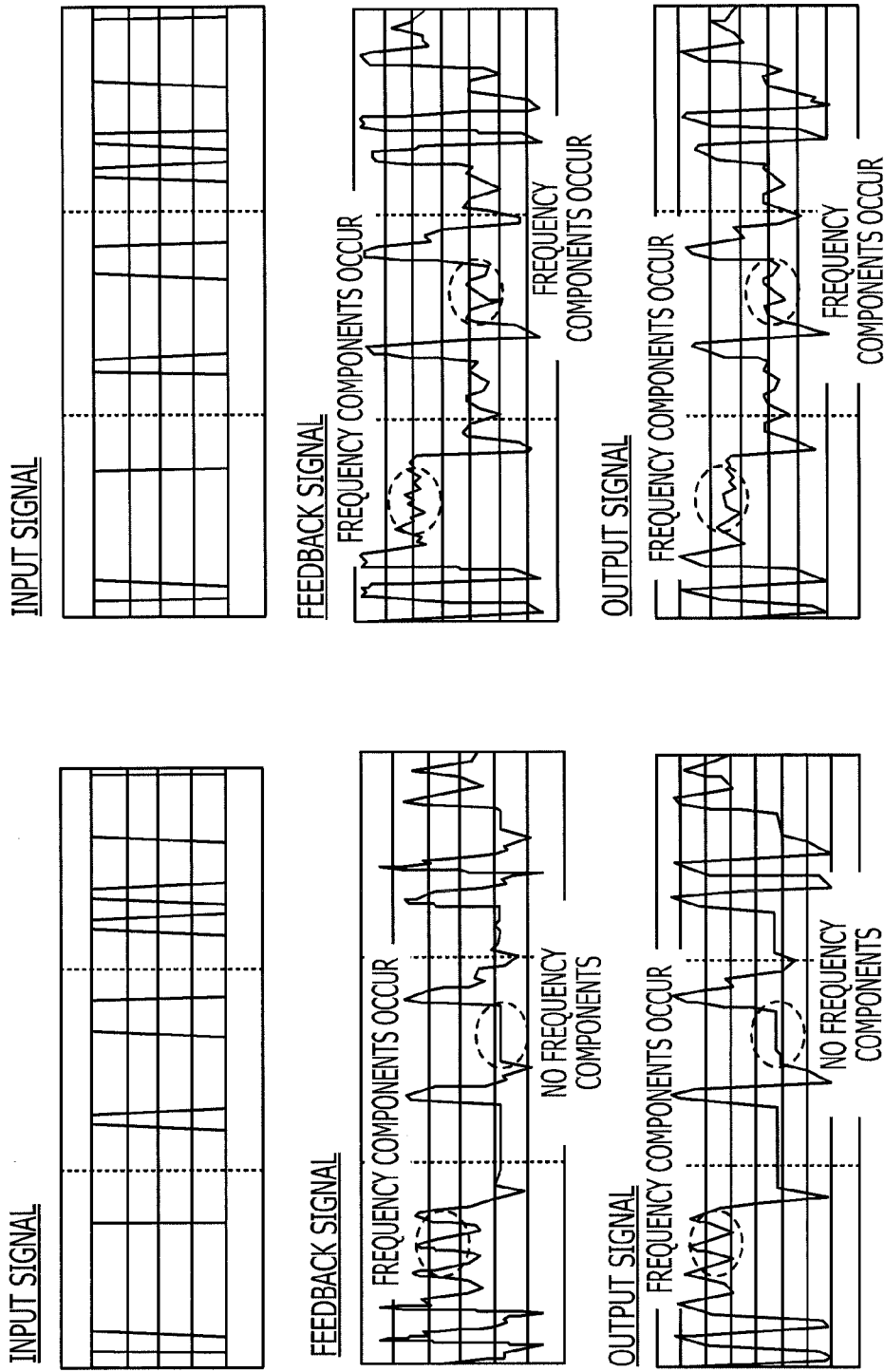

EMPHASIS CIRCUIT AND TRANSMITTER

CROSS-REFERENCE TO RELATED APPLICATIONS

This application is based upon and claims the benefit of priority of the prior Japanese Patent Application No. 2011-289708, filed on Dec. 28, 2011, the entire contents of which are incorporated herein by reference.

FIELD

The embodiment discussed herein is related to an emphasis circuit and a transmitter.

BACKGROUND

The data rates for transmitting large amounts of data with one signal is improved in the field of communications. Emphasis signals having a portion in which inter-symbol interference in signals often occurs is enhanced is used for high speed data in order to address degradation caused by inter-symbol interference in cables, boards, output devices and the like.

Related techniques are discussed in Japanese Laid-Open Patent Publication No. 2004-88693 and in ESSCIRC 2002 pages 351 to 354.

SUMMARY

According to one aspect of the embodiments, an emphasis circuit includes: an applying circuit to add an emphasis signal to an input differential signal; a feedback path to feed back a differential output of the applying unit; a comparing circuit to compare a direct current component level of a positive phase signal and of a negative phase signal of the differential signal; a direct current component level controlling circuit to control a direct current component level of at least one of the positive phase signal and the negative phase signal; a delay unit circuit to add a delay to at least one of the fed-backed differential signal to generate the emphasis signal and inputs the emphasis signal into the applying unit; and a dummy load coupled to a positive phase signal output or a negative phase signal output of the applying unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 12A and 12B illustrate an exemplary simulation result.

DESCRIPTION OF EMBODIMENT

Figure 1A:
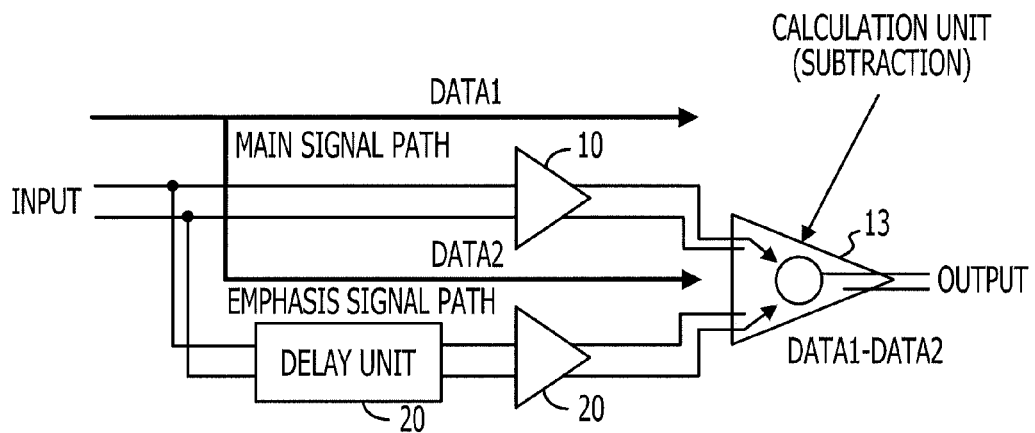
FIG. 1A illustrates an exemplary emphasis circuit.
Figure 1B:
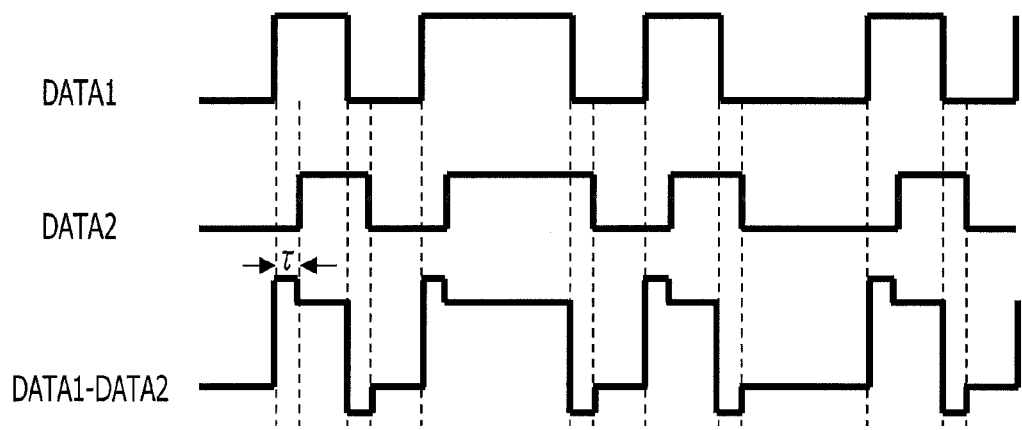
FIG. 1B illustrates an exemplary emphasis signal.
Figure 1C:
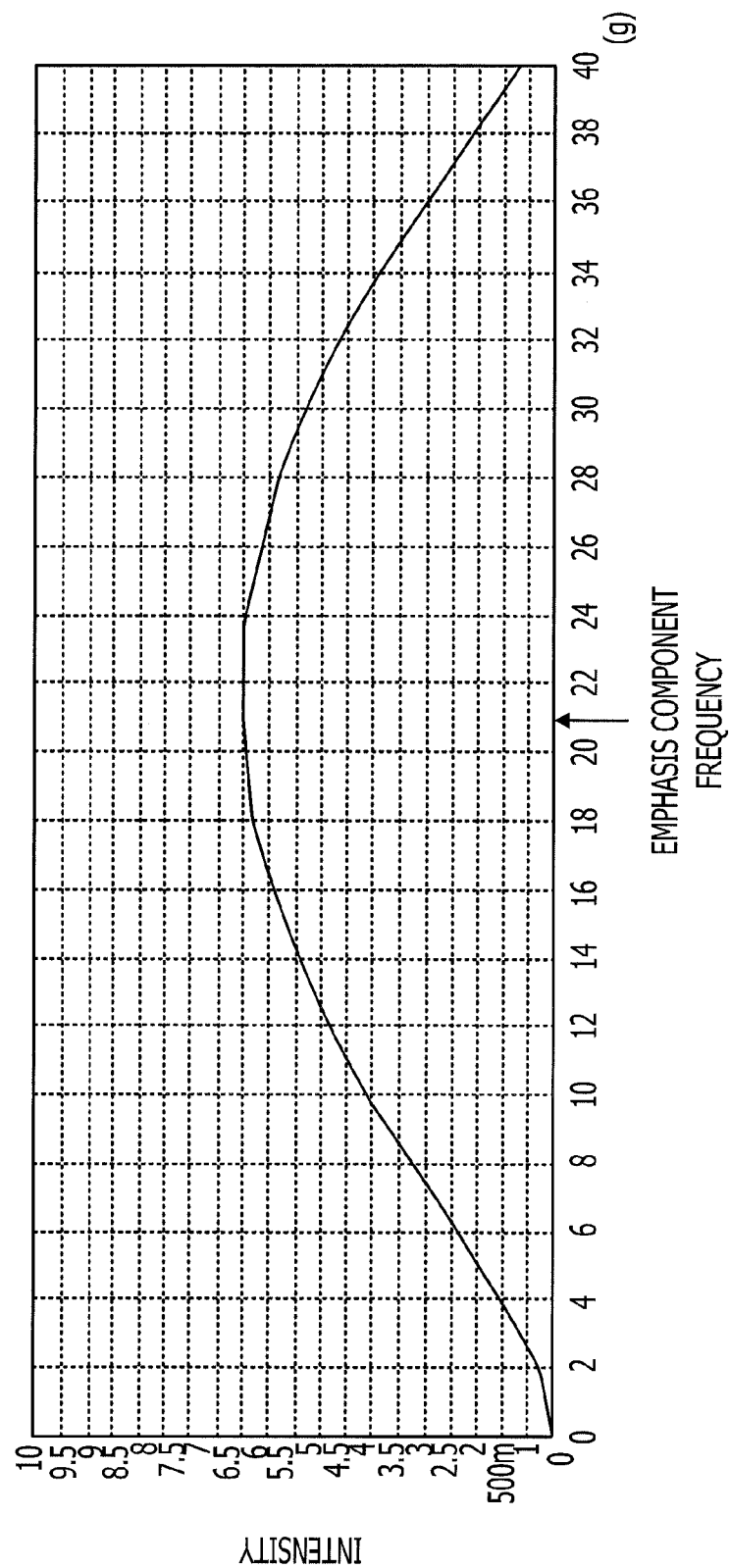
FIG. 1C illustrates an exemplary spectrum.

FIG. 1A illustrates an exemplary emphasis circuit. The emphasis circuit illustrated in FIG. 1 employs a graphic FIR system. A delay difference is generated by a signal branch and an emphasis signal is generated by adding or subtracting the signal having the delay difference (finite impulse response (FIR) system). As illustrated in FIG. 1A, an input signal is branched into a main signal path and an emphasis signal path. A signal Data1 in the main signal path is inputted into a subtractor 13 via a main driver 10. An emphasis signal Data2 in the emphasis signal path is delayed by a delay unit 20 and then is inputted into the subtractor 13 via an emphasis driver 11. The emphasis signal Data2 is subtracted from the main signal Data1 in the subtractor 13 and then output. FIG. 1B illustrates an exemplary emphasis signal. As illustrated in FIG. 1B, a signal in which the main signal Data1 is delayed by a time T may be the emphasis signal Data2. A signal (emphasized signal) in which the rise and fall of the main signal Data1 is emphasized is obtained by subtracting the emphasis signal Data2 from the main signal Data1. FIG. 1C illustrates an exemplary spectrum. As illustrated in FIG. 1C, the spectral intensity of the frequencies in which the emphasis components occur are large in the spectrum of the main signal.

An emphasis signal having an intense frequency component is generated by feedbacking a signal obtained based on the addition or the subtraction of the delayed signal (infinite impulse response (IIR)).

Figure 2A:
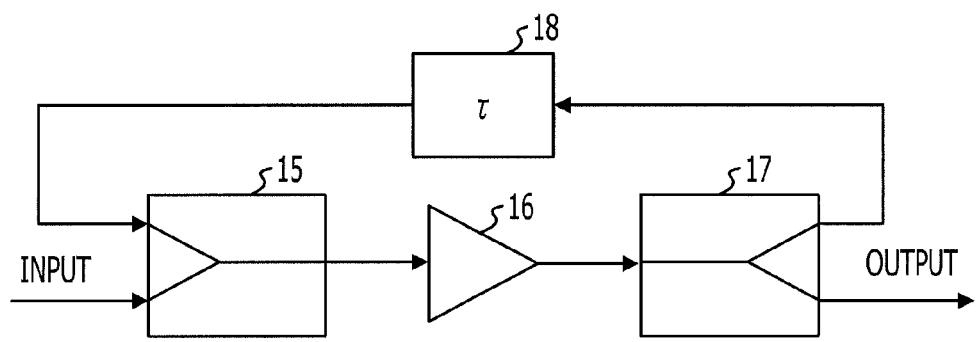
FIG. 2A illustrates an exemplary emphasis circuit.
Figure 2B:
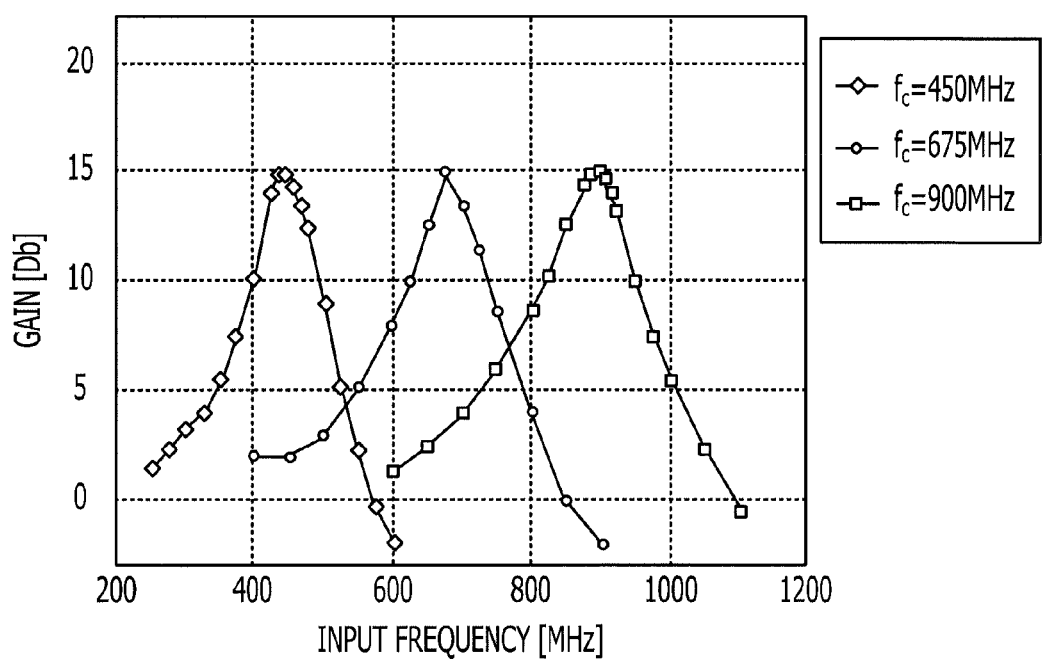
FIG. 2B illustrates exemplary spectra.

FIG. 2A illustrates an exemplary emphasis circuit. The emphasis circuit illustrated in FIG. 1 employs an IIR system. As illustrated in FIG. 2A, an input signal is multiplexed with a signal from a feedback path in an electric power multiplexer 15, amplified in an amplifier 16, then demultiplexed in an electric power demultiplexer 17 and output. The signal demultiplexed by the electric power demultiplexer 17 is delayed by a delay unit 18 (delay time T) in the feedback path and multiplexed with the input signal by the electric power multiplexer 15. FIG. 2B illustrates an exemplary spectra. As illustrated in FIG. 2B, an output signal includes spectra in which input frequency gains have peaks. The positions of the peaks of the spectra illustrated in FIG. 2B are portions in which the emphasis components occur.

A circuit in the IIR system is used in a wireless bandpass filter and the like and is used in the generation of an emphasis signal since the signal has strong specific frequency components.

Figure 3A:
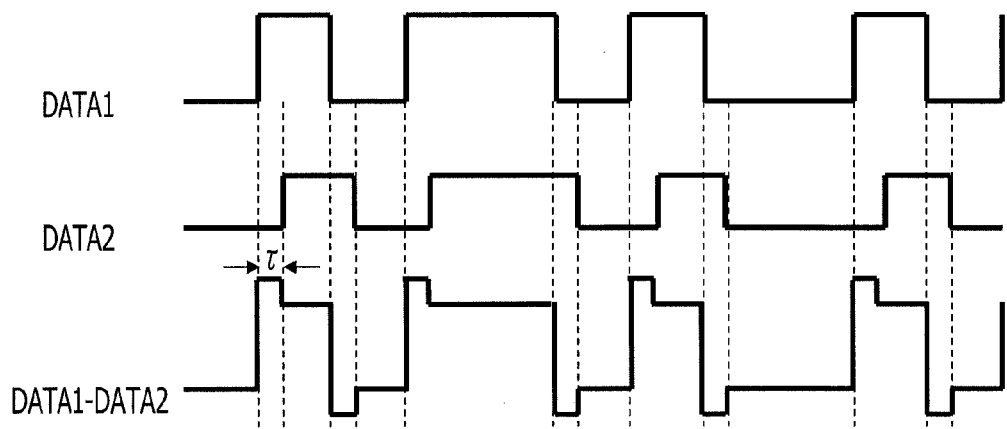
FIGS. 3A and 3B illustrate an exemplary signal.
Figure 3B:
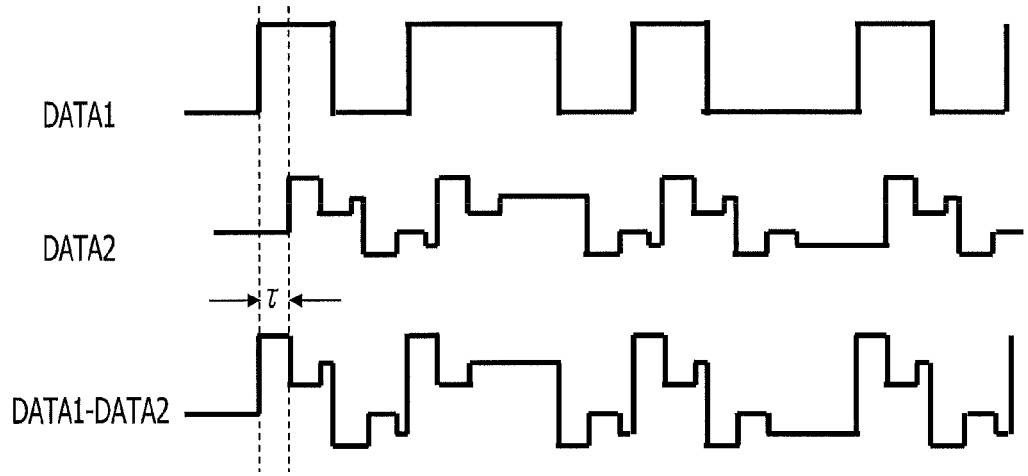
Figure 4:
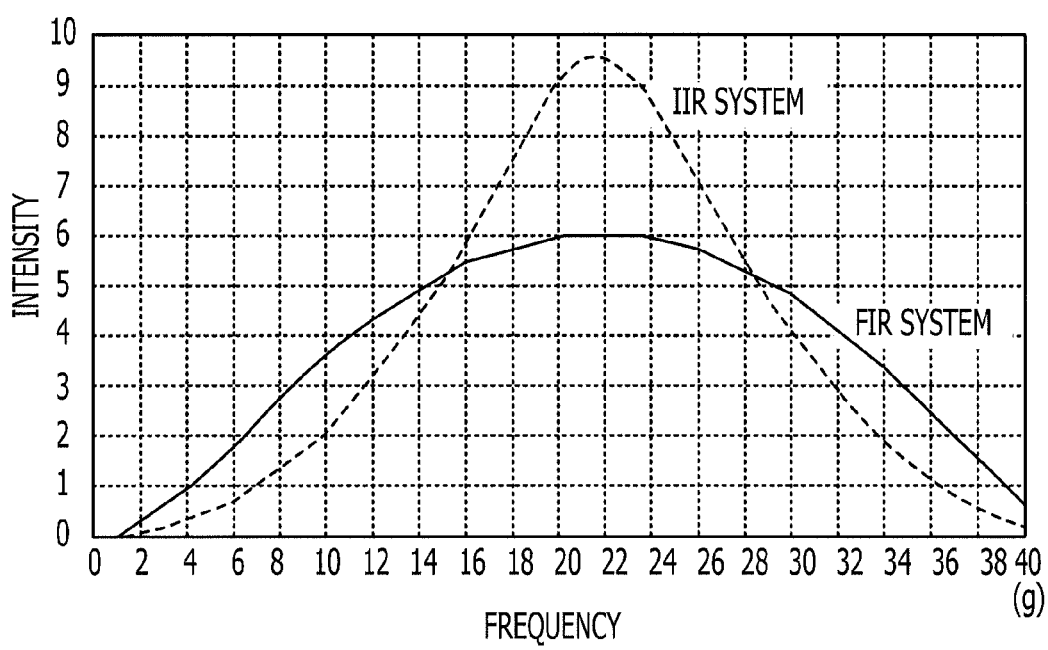
FIG. 4 illustrates an exemplary spectrum of an emphasis signal.

FIGS. 3A, 3B, and 4 illustrate an exemplary emphasis signal. The drawings depict a comparison of emphasis signals generated when using the FIR system and the IIR system. FIG. 3A illustrates a signal waveform in an FIR system, and FIG. 3B illustrates a signal waveform in an IIR system. A Data1 and a Data2 in the FIR system are respectively an input signal and a signal obtained by delaying the input signal. The Data1 in the IIR system is an input signal, and the Data2 is an output signal after an emphasis component has been added. The output signal Data1-Data2 in the IIR system has a more complex waveform and includes more frequency components than that of the FIR system.

FIG. 4 illustrates a spectrum of an emphasis signal. In FIG. 4, an output signal spectrum of an emphasis circuit in an FIR system using a certain delay amount, and an output signal spectrum of an emphasis circuit in an IIR system using the same delay amount are illustrated. As illustrated in FIG. 4, the intensity of the emphasis component at the peak in the IIR system is higher.

When an equivalent delay, an equivalent addition ratio, or an equivalent subtraction ratio (the ratio of two signals in a subtractor in the FIR system, or the ratio of two signals in an electric power multiplexer in the IIR system) are used, the IIR system generates an emphasis signal having a steep and strong frequency characteristic as illustrated in FIG. 4. A steep frequency characteristic indicates that the energy of the spectral component is centered at the peak. A gentle spectrum indicates that the amount of energy centered at the peak of the emphasis component is small.

Figure 5A:
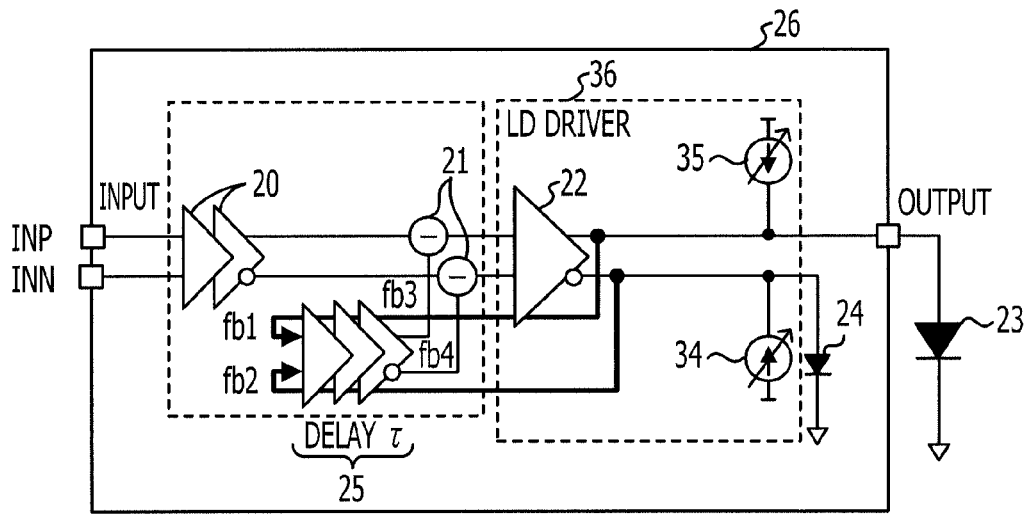
FIG. 5A illustrates an exemplary emphasis circuit.

FIG. 5A illustrates an exemplary emphasis circuit. A circuit in which a positive phase signal input INP, a negative phase signal input INN and an output terminal are provided is arranged on a substrate 26.

Figure 5B:
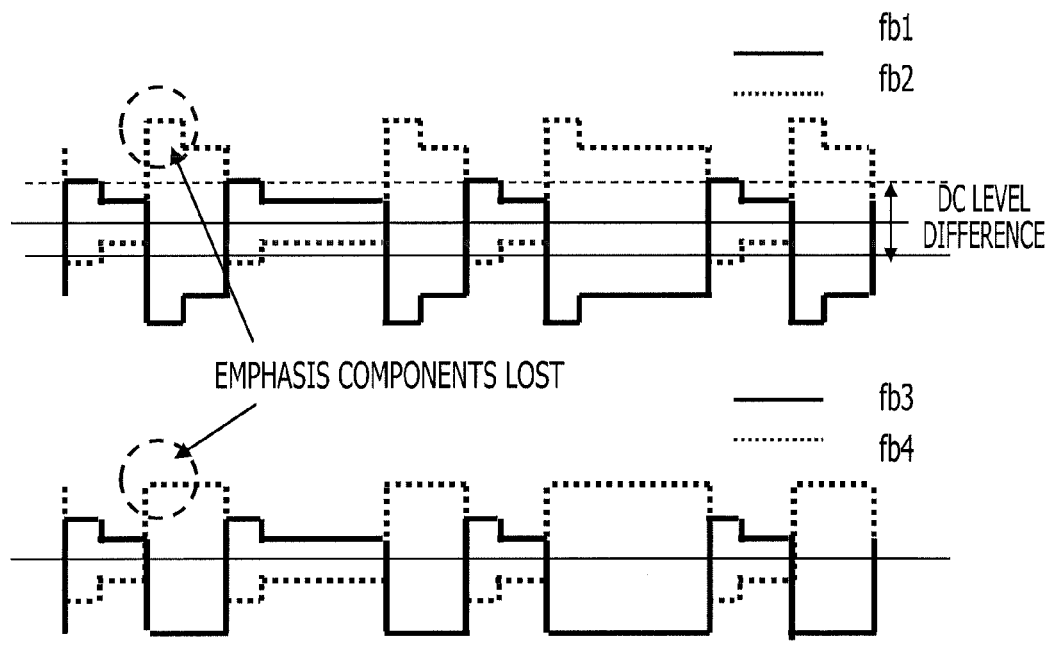
FIG. 5B illustrates an exemplary emphasis signal.

In the IIR system, the output signal is fed back to a delay unit to be delayed, and the delayed output is input into an add/subtract circuit (electric power multiplexer). If the output signal is a differential signal, the output loads of the differentials may not be equal in a pseudo differential system in which a Vertical Cavity Surface Emitting laser (VCSEL) is drived by the positive phase signal of the differential output, and a dummy load is drived by the negative phase signal. The positive phase signal INP and the negative phase signal INN are input. The differential signals pass through buffers 20, subtractors 21, and a buffer 22 and are supplied to a VCSEL 23 and a dummy load 24. For example, the subtractors 21 and the buffer 22 may be integrated as described in Japanese Laid-Open Patent Publication No. 2004-88693. The output of the buffer 22 in an LD driver 36 is input into a delay unit 25 via a feedback path. The differential signals are delayed by the delay unit 25 and input into the subtractors 21. The delayed differential signals are subtracted from the differential signals from the input in the subtractors 21. Bias current sources 35 and 34 adjust DC levels of the positive phase signal and the negative phase signal respectively to establish the same DC levels. FIG. 5B illustrates an exemplary emphasis signal. Since the impedances and operating thresholds of the VCSEL 23 load and the dummy load 24 are different, a difference in the levels of the DC components of the signals occurs between the positive phase signal and the negative phase signal.

Figure 6A:
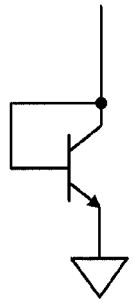
FIGS. 6A and 6B illustrate an exemplary dummy load.
Figure 6B:
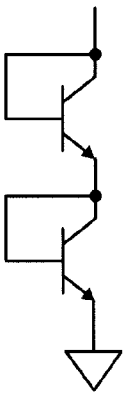
Figure 6C:
FIG. 6C illustrates an exemplary VCSEL.
Figure 6D:
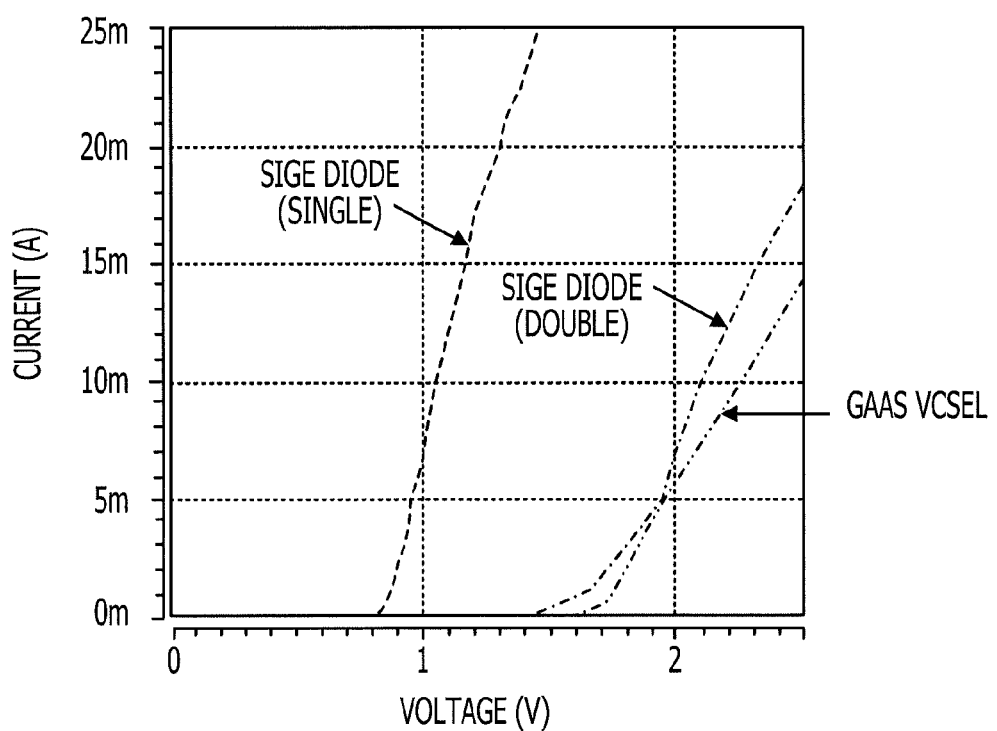
FIG. 6D illustrates exemplary diode characteristics.

FIGS. 6A and 6B illustrate an exemplary dummy load. FIG. 6C illustrates an exemplary VCSEL. FIG. 6D illustrates exemplary diode characteristics. The VCSEL is formed by a GaAs semiconductor and includes the diode characteristics of a threshold of 1.5 V and an input impedance of 55Ω. The diode used as the dummy load is formed by a SiGe semiconductor that is material for a drive circuit, and includes the diode characteristics of a threshold of 0.8 V and an input impedance of 22Ω. As illustrated in FIG. 6B when the SiGe diode is coupled in a series of two stages, the threshold is 1.6 V and the impedance is 44Ω which approaches the characteristics of the GaAs VCSEL diode, but a difference may remain as illustrated in FIG. 6D.

The difference may occur due to differences in the DC levels and the like between the positive phase signal and the negative phase signal. Asymmetry of the waveforms may occur due to a DC offset when the signals are fed back to a delay unit. For example, an asymmetrical pre-emphasis with emphasis applied only on the high side or the low side of the signals may be generated (FIG. 5B).

Figure 7A:
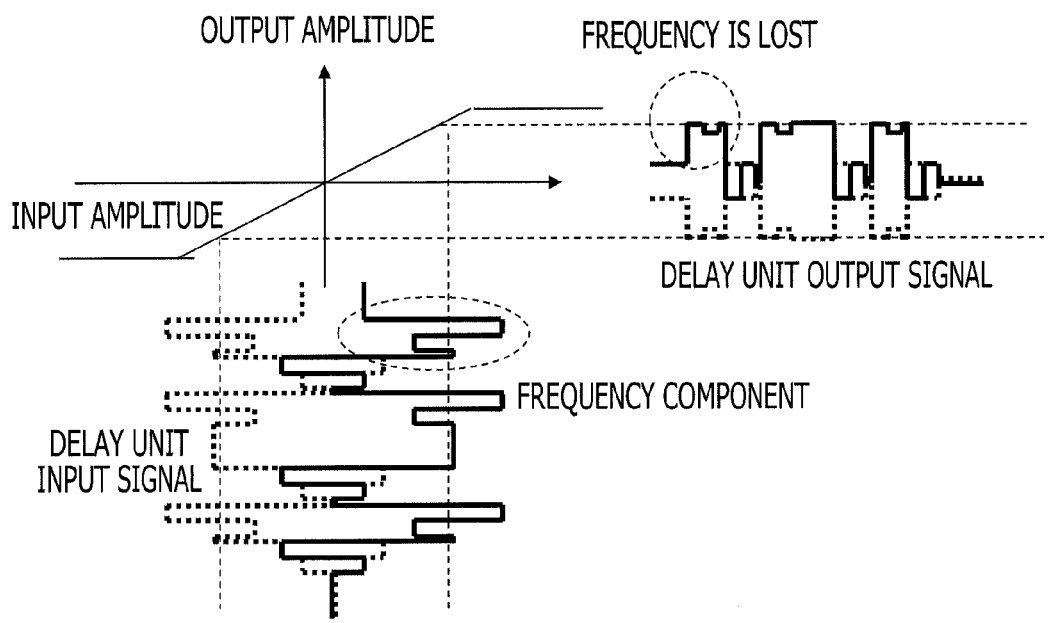
FIGS. 7A, 7B, and 7C illustrate an exemplary emphasis signal.
Figure 7B:
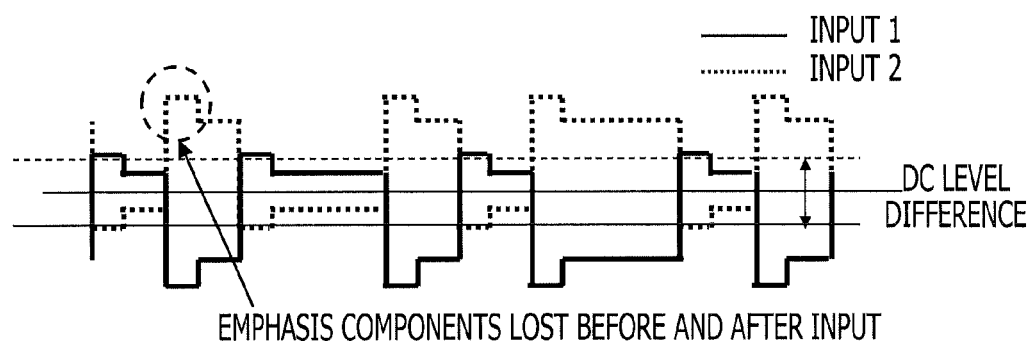
Figure 7C:
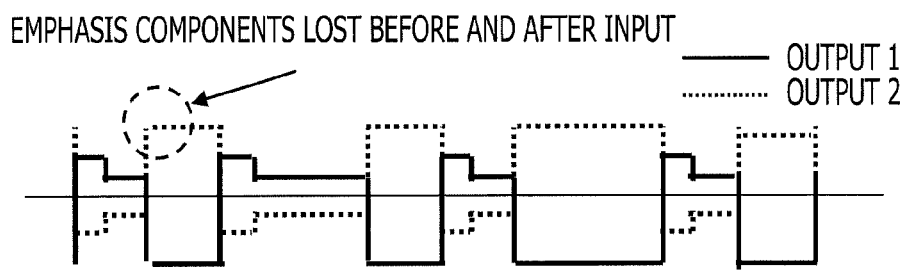

FIGS. 7A, 7B, and 7C illustrate an exemplary emphasis signal. FIG. 7A illustrates characteristics of output amplitude with respect to input amplitude of a delay unit. Although the output amplitude responses in a linear manner to the input amplitude, the output amplitude is saturated when the input amplitude increases by a certain amount and the characteristics may become non-linear. As a result, the delay unit may cut the amplitude if the amplitude oscillates greatly based on differences in the DC levels between the positive phase signal and the negative phase signal of the differential signals. When the amplitude is cut, components (frequency components) of the emphasis signal are cut and the emphasis may not be generated. In FIG. 7B, the signals are input into the delay unit, and the output amplitude of the delay unit is saturated in FIG. 7C. Although the emphasis components are visible in portions of the input signal indicated by the circle of the dashed line in FIG. 7B, the emphasis components of the portion indicated by the circle of the dashed line in FIG. 7C may be lost.

Figure 8:
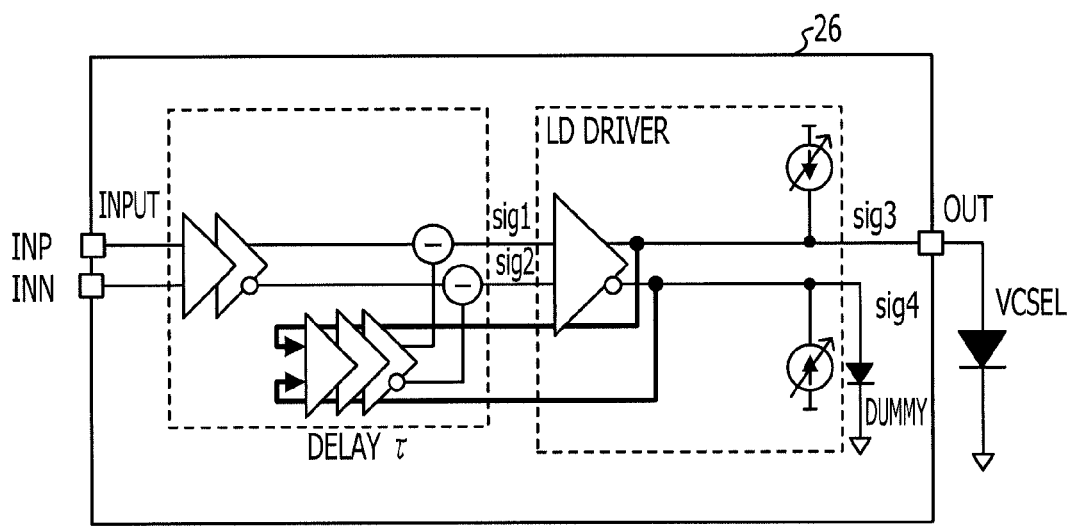
FIG. 8 illustrates an exemplary emphasis circuit.
Figure 9:
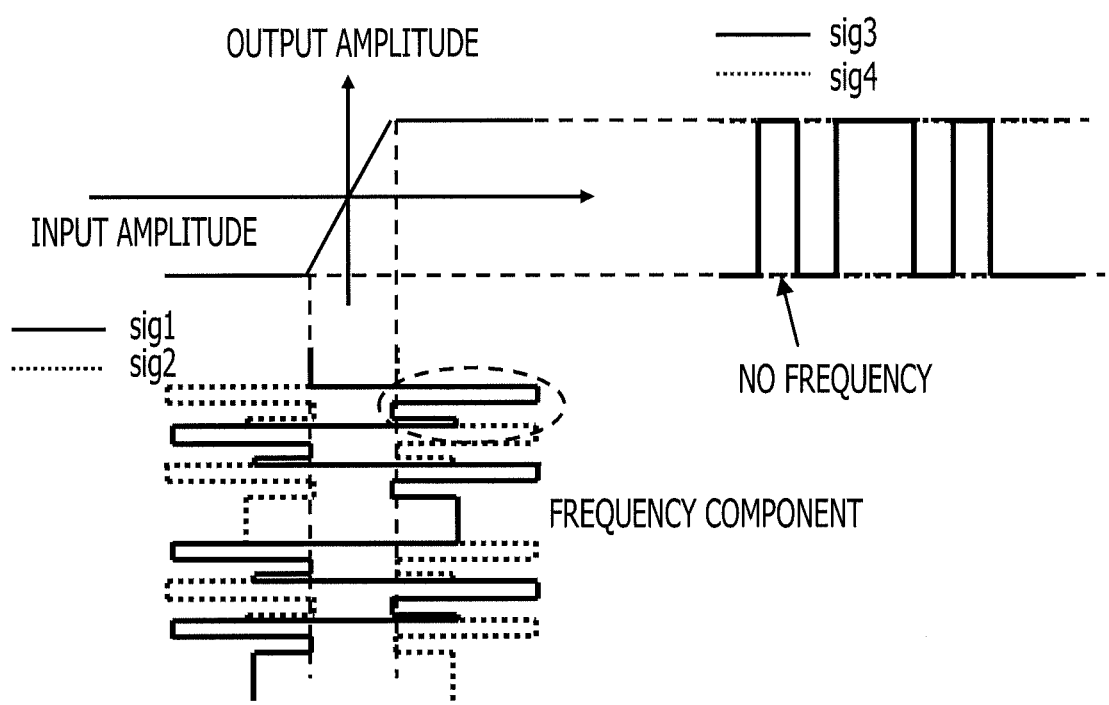
FIG. 9 illustrates an exemplary emphasis signal.

FIG. 8 illustrates an exemplary emphasis circuit. To avoid the occurrence of a differential, one more buffer is added between the drive device such as the VCSEL and the like and the output after the branching of the feedback signal and the output signal. Although the DC offset problem does not occur, the output buffer may not demonstrate linear characteristics. For example, a linear state may not be maintained during the full adjustment range when an output is adjusted by a drive device such as a driver circuit. FIG. 9 illustrates an exemplary emphasis signal. As illustrated in FIG. 5A when the subtractors 21 and the buffer 22 are integrated, the emphasis components may be lost when passing through an output buffer circuit having non-linearity as illustrated in FIG. 9.

Figure 10A:
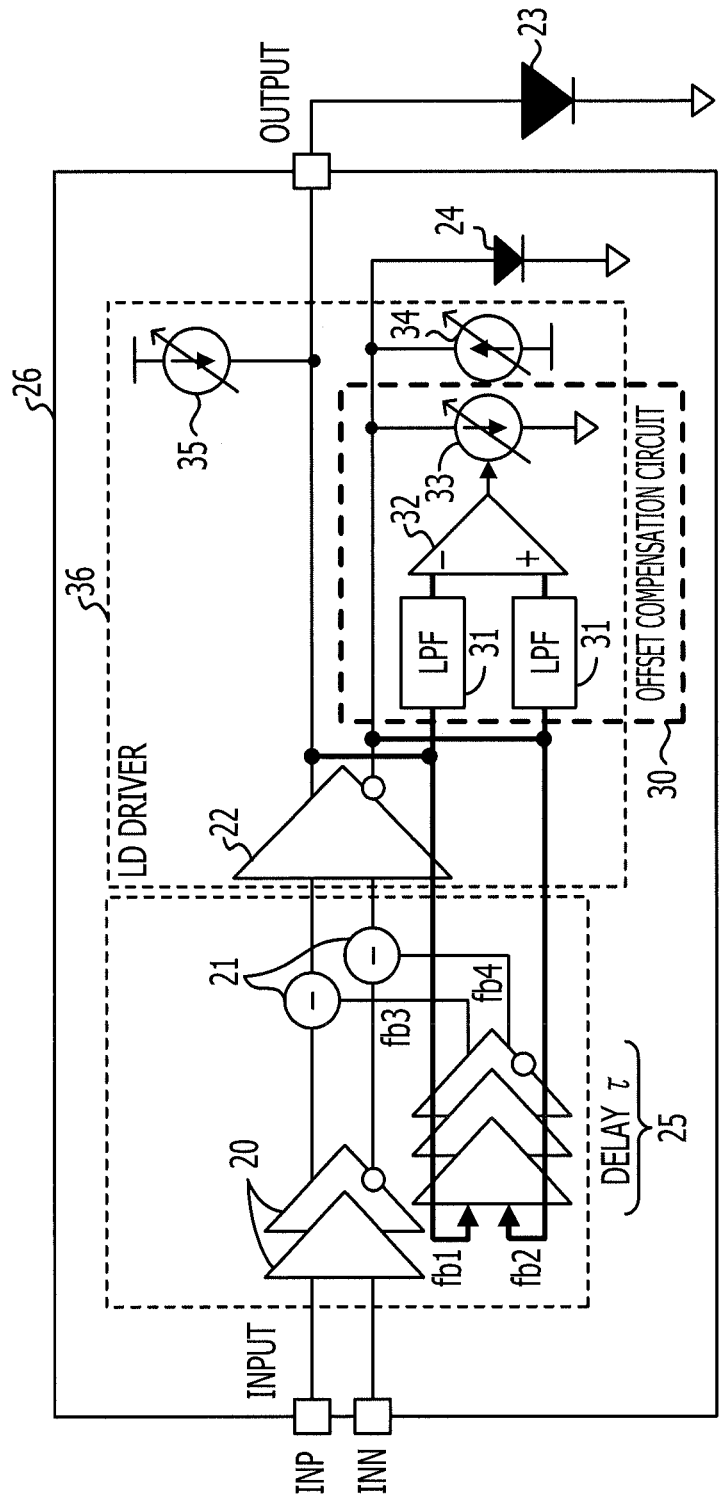
FIG. 10A illustrates an exemplary emphasis circuit.
Figure 10B:
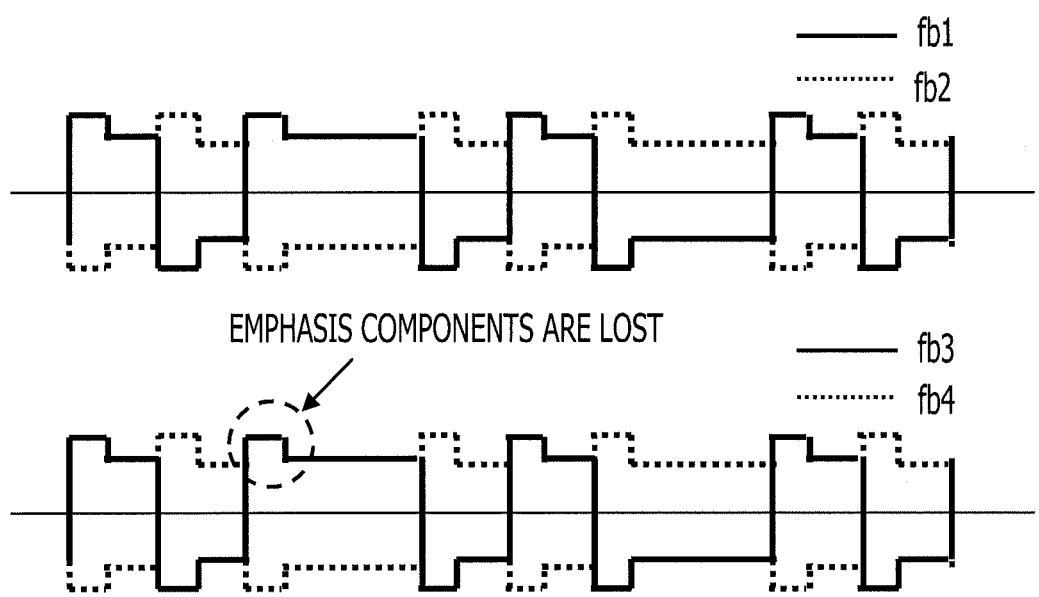
FIG. 10B illustrates an exemplary emphasis signal.

FIG. 10A illustrates an exemplary emphasis circuit. FIG. 10B illustrates an exemplary emphasis signal. In FIG. 10A, the same reference symbols are attached to elements that are similar or are substantially the same as those of FIG. 5A, and explanations thereof will be omitted or reduced.

A comparator circuit 32 such as an operating amplifier compares DC levels between differentials of output signals. The comparison results are coupled to one or both of the bias current sources 33 between the differential output signals so that the currents are sank or sourced to compensate for the DC level differences. For example, even if the differential outputs are different and asymmetry occurs, a pre-emphasis signal is generated with an emphasis symmetric on both the high side and the low side of the signals, since signals with the DC level compensated so that there is no DC level difference are fed back.

The output of the buffer 22 is branched to a feedback path in FIG. 10A. A DC component is extracted from the branched signal by low-pass filters 31 of an offset compensation circuit 30 and input into the comparator circuit 32 of the offset compensation circuit 30. Based on comparison results, the comparator circuit 32 supplies a drive signal to the bias current source 33 additionally provided in the offset compensation circuit 30 to remove the difference between the DC levels of the positive phase signal and the negative phase signal. The low-pass filters 31 are provided in the comparator circuit 32 so that differential signal DC components are input. For example, DC components may be extracted even if the feedback signal is applied as-is since a parasitic capacitance and the like exists in the input terminal of the comparator circuit 32. The low-pass filters 31 may be omitted.

Although the DC level of the negative phase signal is adjusted by the bias current source 33 in FIG. 10A, the DC level of the positive phase signal or both DC levels may be adjusted. Since the DC levels of the feedback signals input into the delay unit 25 match when the DC levels of the positive phase signal and the negative phase signal match, the DC levels of the delay signals subtracted from the input differential signals in the subtractors 21 are the same. As a result, the emphasis components added to the input differential signals may be symmetrical on the positive phase signal side and the negative phase signal side and the emphasis components may not be lost.

The emphasis components may not be lost in FIG. 10B. Since there are no DC level differences between signals fb1 and fb2 that are feedback signals, there is no difference in the DC levels of emphasis signals fb3 and fb4 after the delay. Loss of the emphasis components based on the asymmetry of the positive phase signal and the negative phase signal, or loss of the emphasis components based on the oscillation of the emphasis signal amplitude, may be reduced.

Figure 11A:
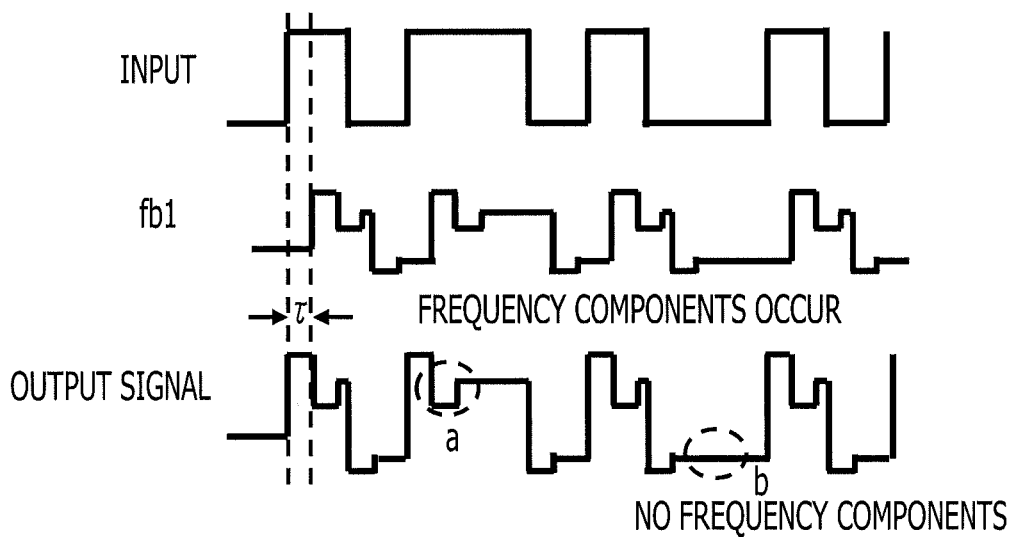
FIGS. 11A and 11B illustrate an exemplary emphasis signal.
Figure 11B:
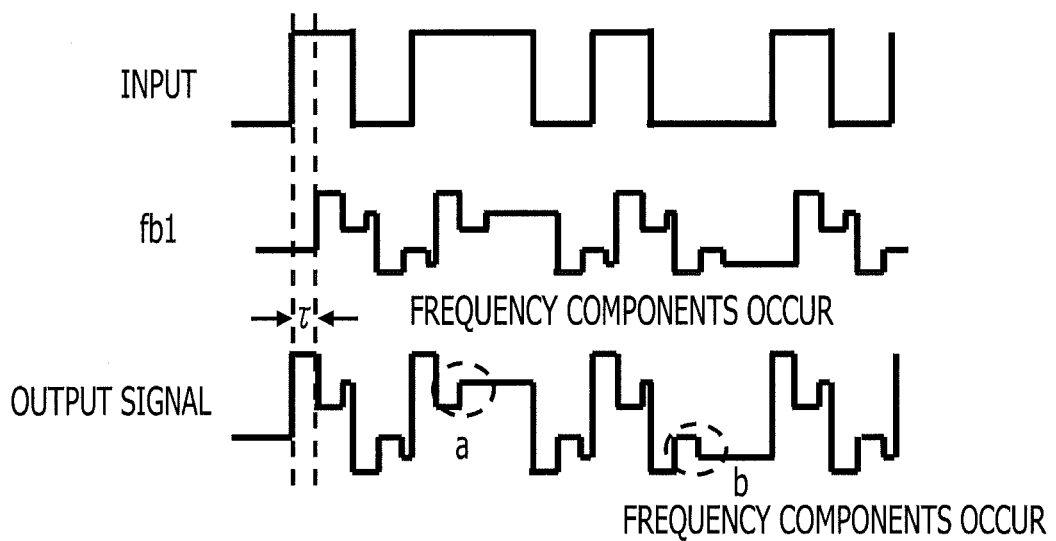

FIGS. 11A and 11B illustrate an exemplary emphasis signal.

Although the feedback signal fb1 has frequency components in FIG. 11A, the output signal does not have frequency components. When the feedback signal fb1 has frequency components in FIG. 11B, the output signal has frequency components.

In a configuration using the IIR system, bias in the signals occurs based on offsets between the differential signals, and a limiter may be applied to either the rise component or the fall component of the output signals. As a result, the frequency components of the rise or the fall of the feedback signals may be lost. A signal having a frequency component of the rise of the signal changes in a portion "a" illustrated in FIG. 11A. A portion "b" in FIG. 11A is a smooth portion of the fall of the signal and the frequency component does not occur. As a result, the frequency components of both signals are lost and emphasis with an asymmetric rise and fall is obtained.

As illustrated in FIG. 11B, frequency components occur in the "a" portion and the "b" portion. The signal bias may be reduced and emphasis with a symmetric rise and fall may be added since the offset between the differential signals is compensated. A steep and intense frequency characteristic, which is one of characteristics of the IIR system in which frequency emphasis signals are fed, may be obtained.

FIGS. 12A and 12B illustrate an exemplary simulation result. An input signal is a1, a feedback signal is a2, and an output signal is a3 in FIG. 12A. For example, the portions circled by the dashed lines indicate portions in which frequency components occur and portions in which frequency components do not occur.

An input signal is b1, a feedback signal is b2, and an output signal is b3 in FIG. 12B. For example, the portions circled by the dashed lines indicate portions in which frequency components occur.

The frequency emphasis components are strengthened either on the high side or on the low side in FIG. 12A. The frequency emphasis components may be symmetrically strengthened on the high side and on the low side in FIG. 12B.

Figure 13:
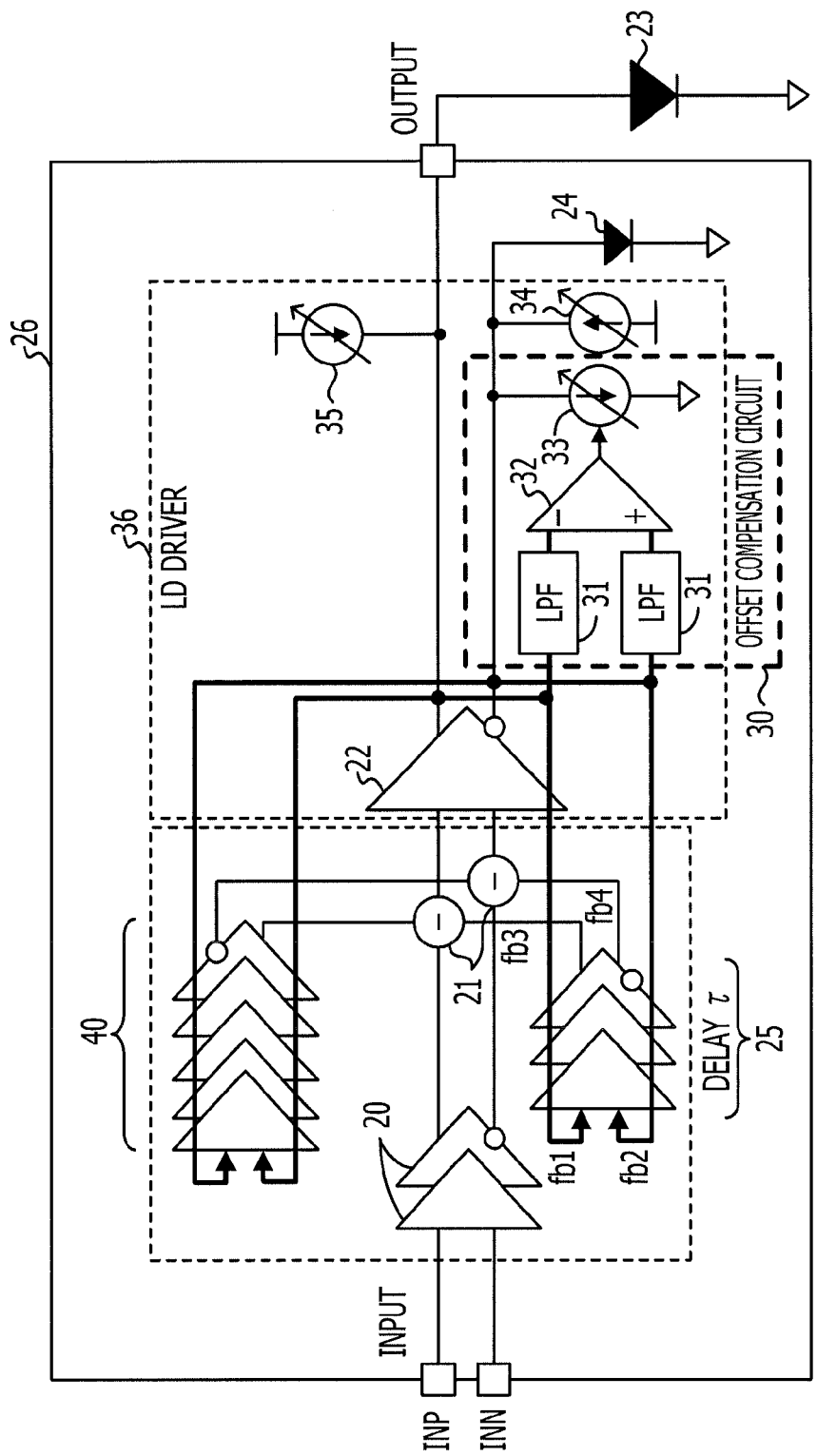
FIG. 13 illustrates an exemplary emphasis circuit.

FIG. 13 illustrates an exemplary emphasis circuit. In FIG. 13, the same reference symbols are attached to elements that are similar or are substantially the same as in FIG. 10A, and explanations thereof will be omitted or reduced.

The output from the buffer 22 is branched into three lines. A delay unit 40 is provided to apply a delay amount different from that of the delay unit 25 to the feedback signal. Since one emphasis signal is generated when the feedback path and the delay unit are one set, emphasis is added to the rise portion or the fall portion of a signal that is preferably emphasized. For example, emphasis may be added to a portion in which another emphasis is desired in addition to the rise or the fall of the signal when the signal is branched into three lines when another feedback path and another delay unit are provided. Freedom in how to add emphasis is improved by increasing the emphasis signals. For example, the number of branches from the output of the buffer 22 may be more than three.

Figure 14:
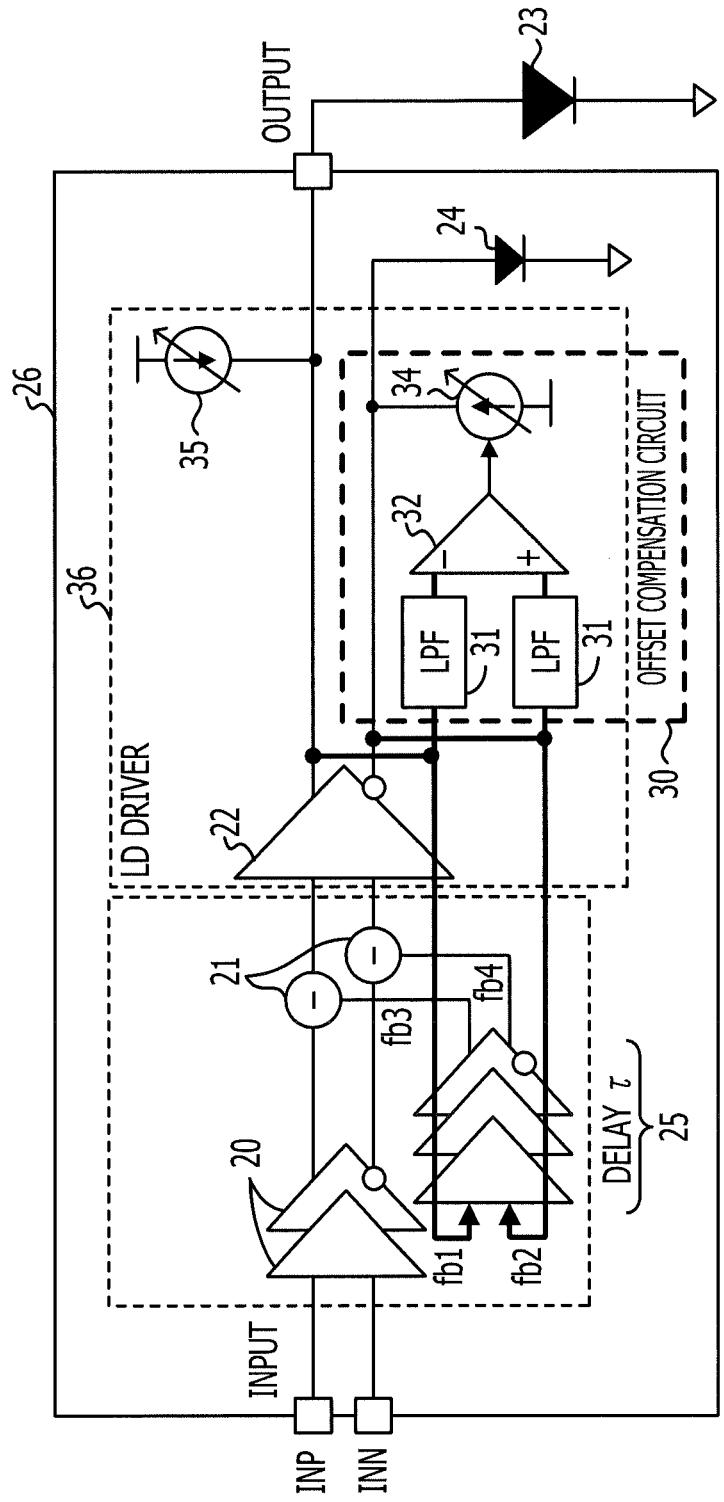
FIG. 14 illustrates an exemplary emphasis circuit.

FIG. 14 illustrates an exemplary emphasis circuit. In FIG. 14, the same reference symbols are attached to elements that are similar or are substantially the same as in FIG. 10A, and explanations thereof will be omitted or reduced.

The additional power source 33 that is controlled according to the results from the comparator circuit 32 is omitted, and a bias current source 34 is controlled directly. The current on the dummy load side is reduced and the power for driving the driver is also reduced.

Figure 15B:
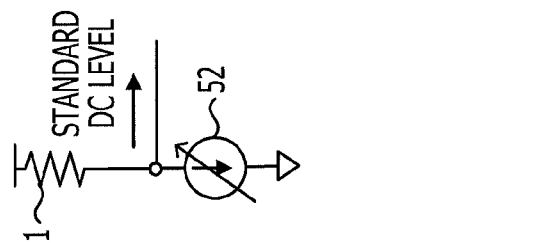
FIGS. 15A and 15B illustrate an exemplary emphasis circuit.
Figure 15A:
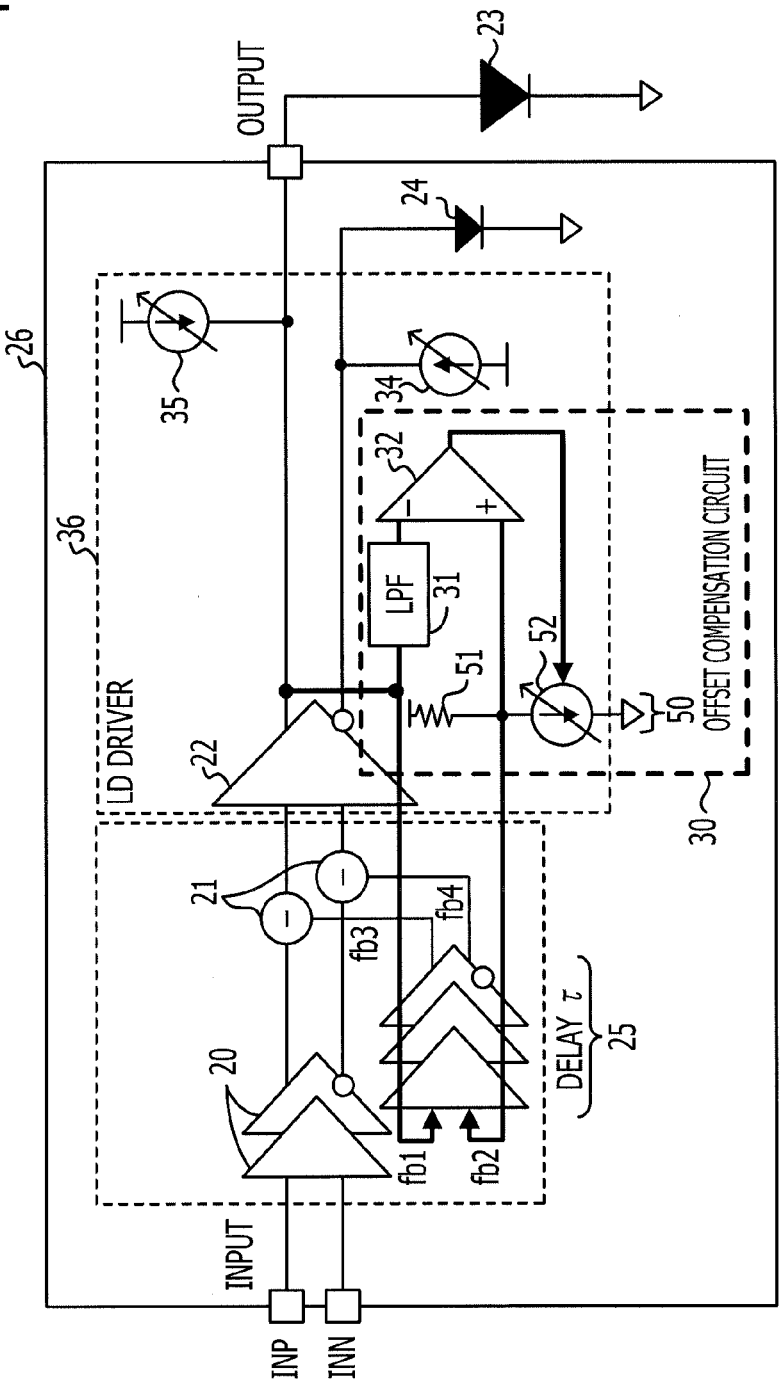

FIGS. 15A and 15B illustrate an exemplary emphasis circuit. As illustrated in FIG. 15A, one of the feedbacks of the differential signal is fed back, and a standard DC level generating circuit 50 is provided on the other feedback path. The DC levels of the feedback signals and the standard DC level generating circuit 50 are compared and the standard DC level of the standard DC level generating circuit 50 is adjusted according to the results of the comparison. For example, the standard DC level generating circuit 50 that is provided includes a load resistor 51 and a variable current source 52 as illustrated in FIG. 15B. The variable current source 52 is controlled according to the comparison results of the feedback signal and the standard DC level.

A feedback signal fb1 may be a signal that changes between "0" and "1," and a feedback signal fb2 may be a DC signal. Since the delay unit 25 is a differential circuit, a differential signal obtained by delaying the difference between the feedback signals fb1 and fb2 is output to signals fb3 and fb4. If the DC level of the feedback signal fb1 and the DC level of the DC signal fb2 match, the differential signals fb3 and fb4 become signals that are symmetrical to the positive phase signal and the negative phase signal based on the operation of the delay unit 25 acting as a differential circuit. As a result, the emphasis applied to the input signals demonstrates symmetry in the positive phase signal and the negative phase signal of the differential signals. The differential circuit may operate in the same way as described above since the differential circuit derives the difference between two inputs and outputs output signals so that changes of the signals are symmetrical in the positive direction and in the negative direction. If the DC level of the feedback signal fb1 does not match the DC level of the DC signal fb2, the amplitude of the differential between the feedback signal fb1 and the DC signal fb2 may become too large. For example, a limit may be applied to the signal amplitude in the delay unit 25 and the frequency components may be lost. When the DC level of the feedback signal fb1 and the DC level of the DC signal fb2 match, the limiting of the amplitude of the differential signal is reduced and emphasis signals having symmetry in the positive phase signal and the negative phase signal may be obtained.

FIGS. 16 to 19 illustrate an exemplary emphasis circuit. In FIGS. 16 to 19, the same reference symbols are attached to elements that are similar or are substantially the same as in FIG. 10A, and explanations thereof will be omitted or reduced.

Figure 16:
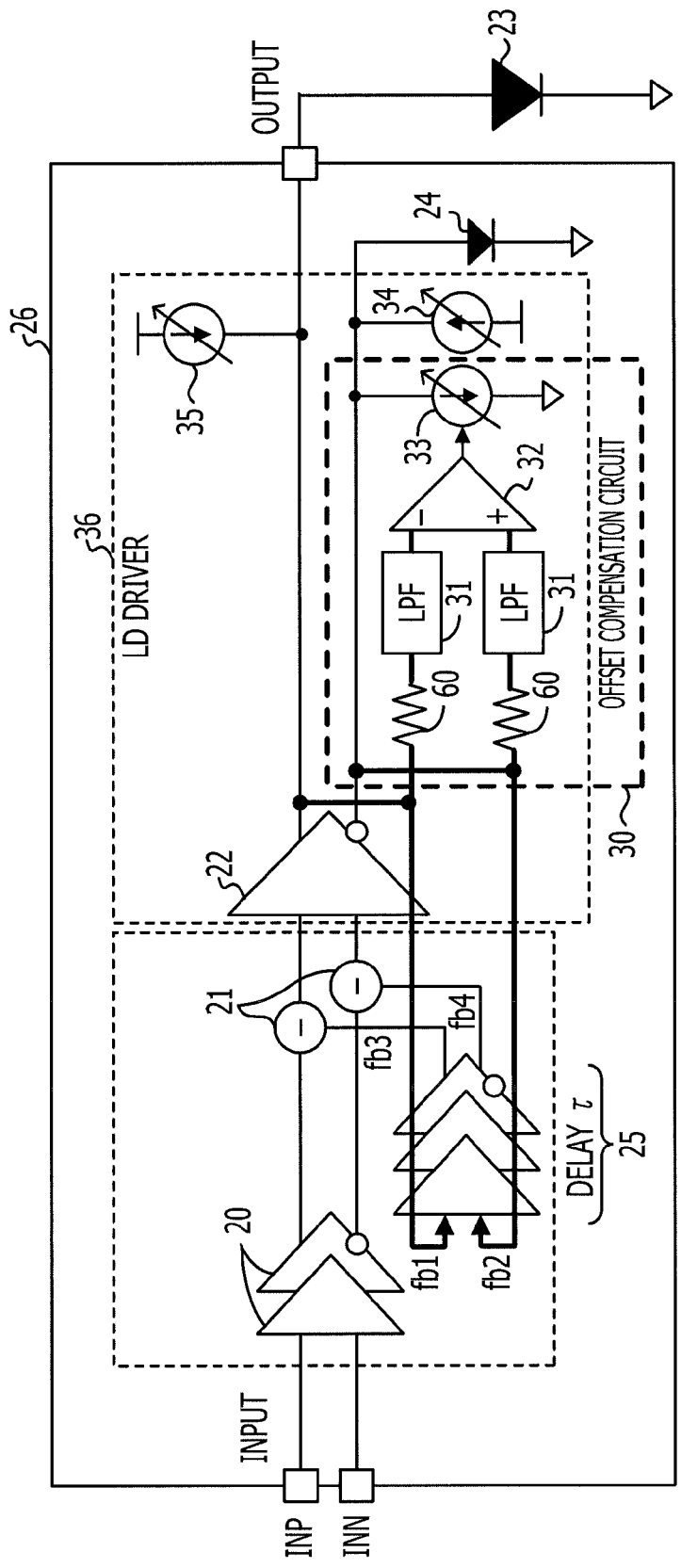
FIG. 16 illustrates an exemplary emphasis circuit.

When the DC levels of the output signals are compared in FIG. 16, degradation of the frequency components of the feedback signals caused by the introduction of the comparator circuit 32 are reduced since resistors 60 are added at the input portions of the comparator circuit 32. For example, since the input terminals of the comparator circuit 32 have impedance due to parasitic capacitance and the like, the effects of the low pass filters may occur on the feedback signals fb1 and fb2. As a result, the frequency components may be degraded due to the low pass filter effects when frequency components for emphasis are fed back. Influences on the electric characteristics due to the addition of the comparator circuit 32 in the feedback path may be reduced by providing the resistors 60 at the input portion of the comparator circuit 32. Reducing the low pass filter effects of the comparator circuit 32 leads to a reduction in the degradation of the frequency signals.

Figure 17:
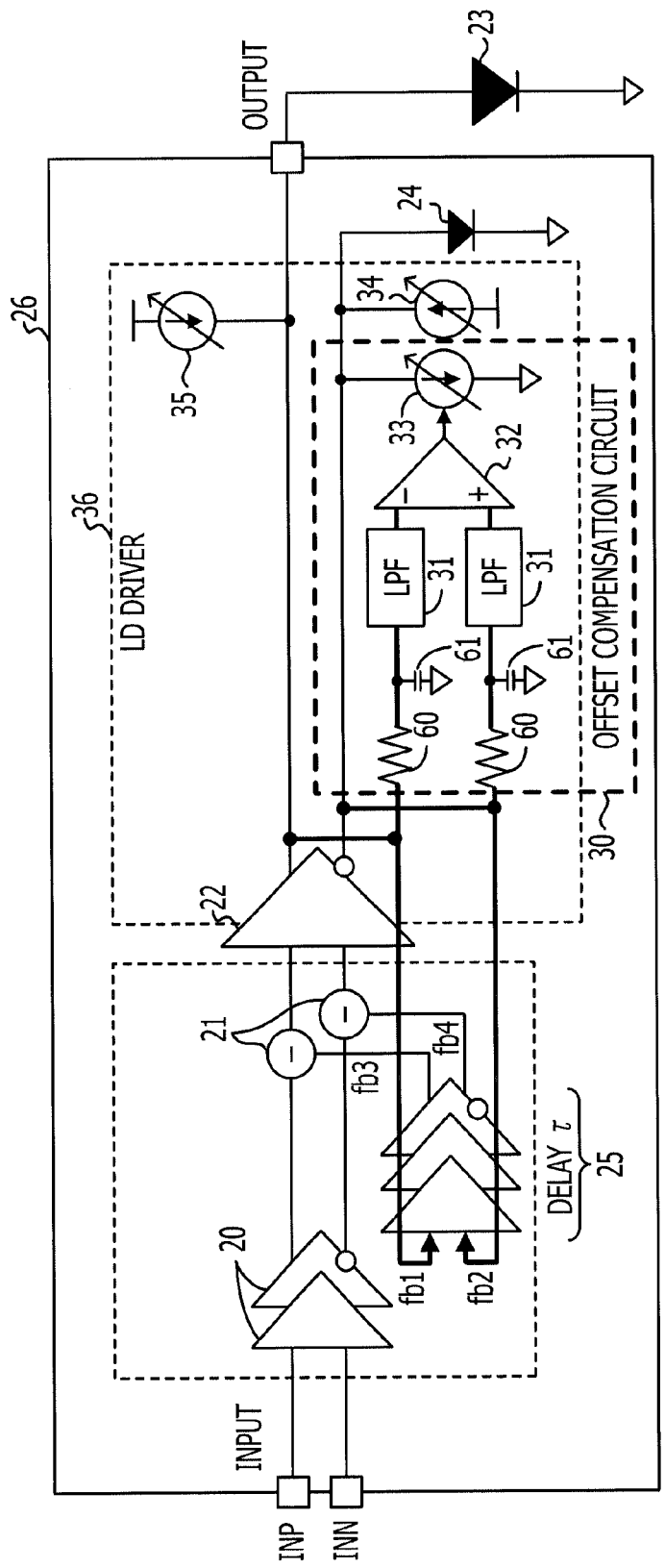
FIG. 17 illustrates an exemplary emphasis circuit.

As illustrated in FIG. 17, since signals are stabilized by adding a GND capacitor 61 to the input terminals of the comparator circuit 32, the comparison of the DC levels may be conducted accurately. For example, since the capacitor 61 delays the change rates of the signals, comparisons with smoothed signals may be conducted. As a result, the comparison of the DC levels may be conducted accurately.

Figure 18:
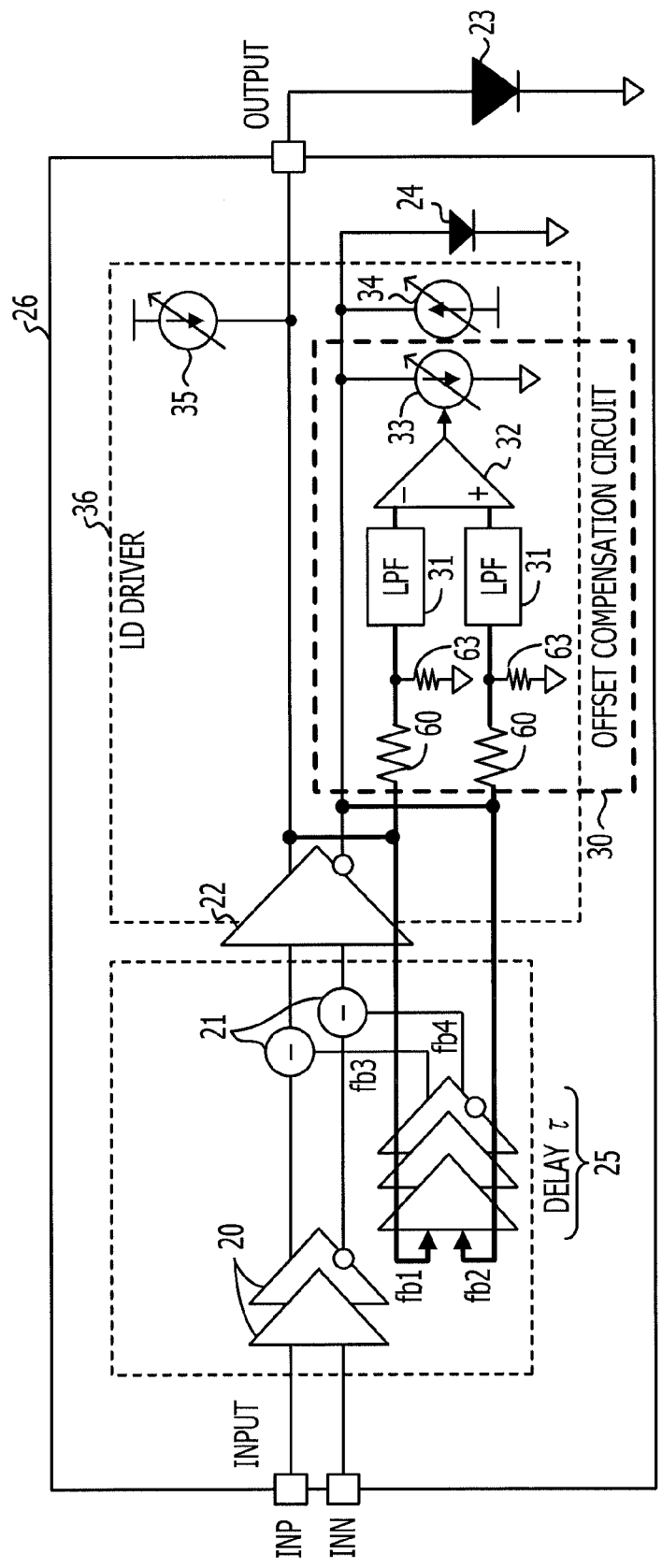
FIG. 18 illustrates an exemplary emphasis circuit.

As illustrated in FIG. 18, resistors 60 and resistors 63 are added to the input side of the comparator circuit 32 so that the degree of controlling the degradation of the frequency signals is controlled. For example, the degree of controlling the degradation of the frequency signals is controlled by changing the resistance values of the resistors 60 and 63. Resistance division to divide and adjust the voltage is conducted by providing a plurality of resistors.

Figure 19:
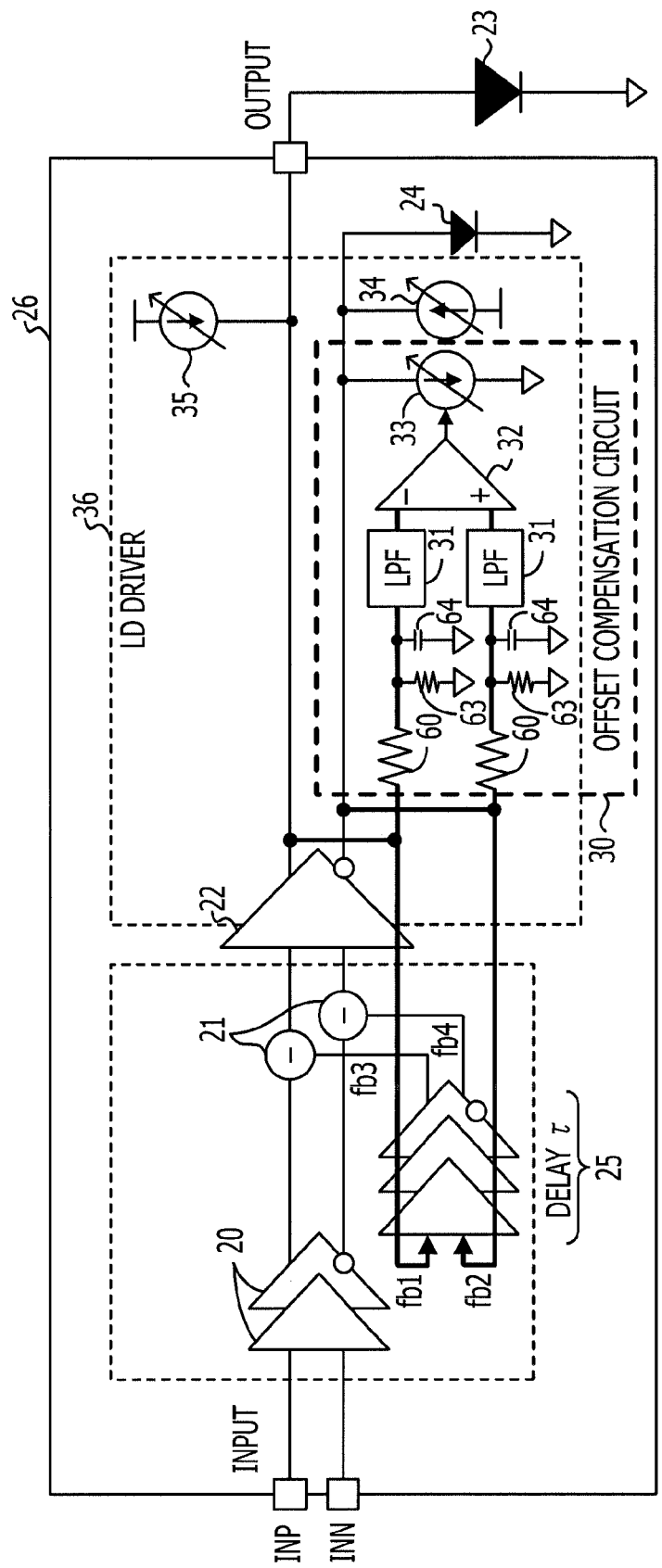
FIG. 19 illustrates an exemplary emphasis circuit.

As illustrated in FIG. 19, by adding the resistors 60, the resistors 63, and capacitors 64 to the input side of the comparator circuit 32, degradation of the frequency signals is reduced so that the comparison of the DC levels by the comparator circuit 32 may be suitably conducted.

Figure 20:
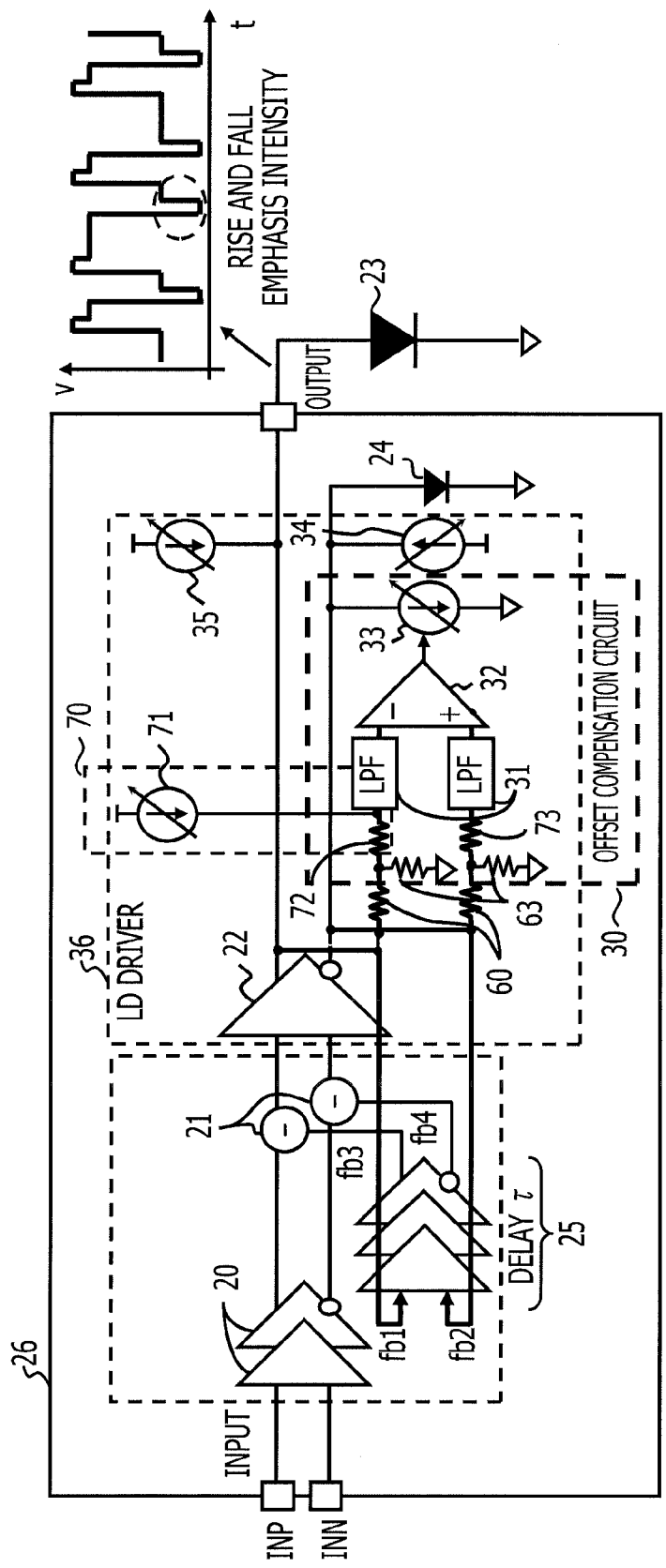
FIG. 20 illustrates an exemplary emphasis circuit.

FIG. 20 illustrates an exemplary emphasis circuit. In FIG. 20, the same reference symbols are attached to elements that are similar or are substantially the same as those in FIG. 18, and explanations thereof will be omitted or reduced.

As illustrated in FIG. 20, an offset generating circuit 70 that is able to adjust DC levels and includes a variable power source 71 and a resistor 72 is provided at the input portion of the comparator circuit 32. A resistor 73 reduces influences on electrical characteristics due to the parasitic capacitance of the comparator circuit 32. The resistor 72 functions as the offset generating circuit 70 and reduces influences on the electric characteristics due to the parasitic capacitance of the comparator circuit 32. Assymetrization of an adjustable pre-emphasis occurs due to the generation of the DC offset. When a device having asymmetry in the rise and fall signals such as the VCSEL 23 and the like is driven, compensation of the asymmetry may be used.

Figure 21A:
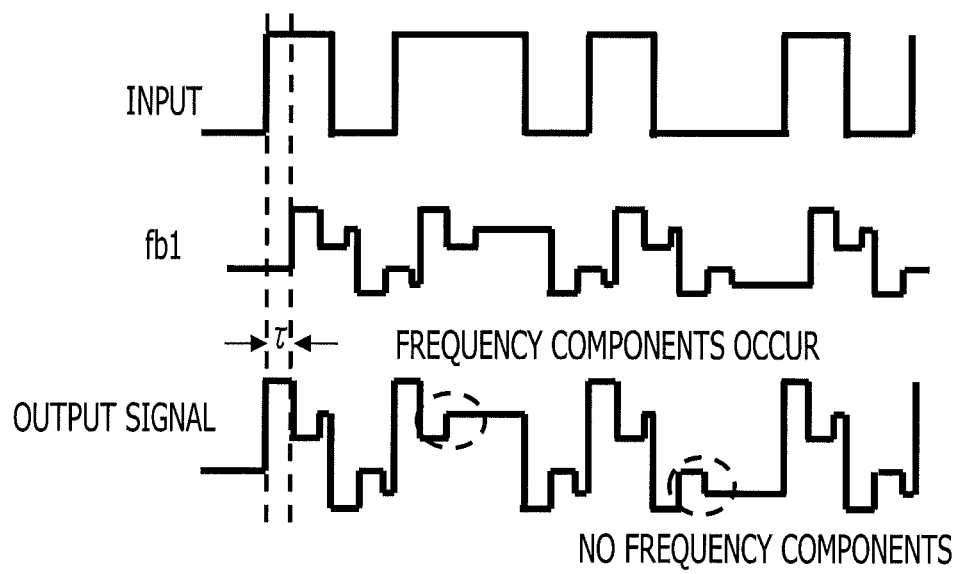
FIGS. 21A and 21B illustrate an exemplary emphasis signal.
Figure 21B:
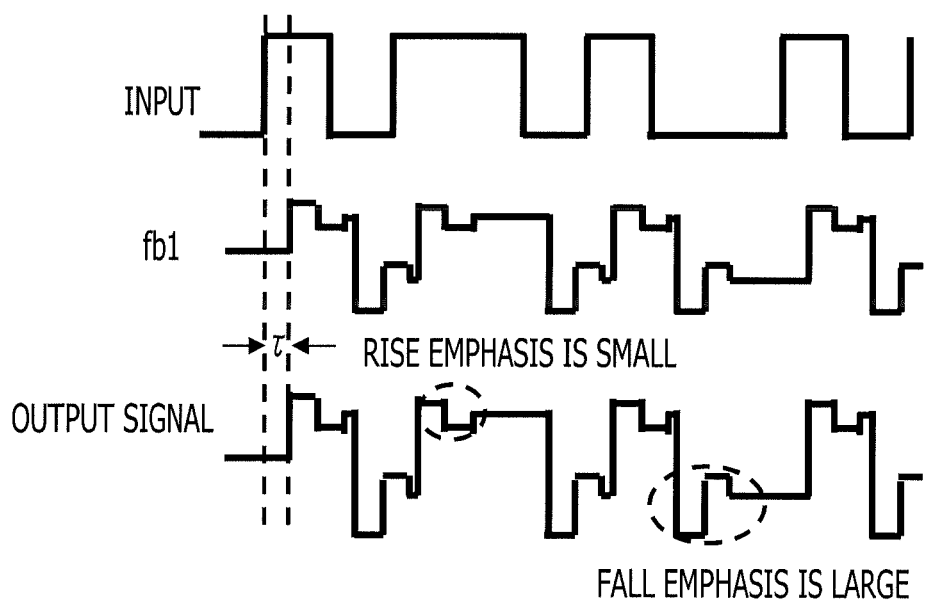

FIGS. 21A and 21B illustrate an exemplary emphasis signal. FIG. 21A is a signal diagram of, for example, the circuit illustrated in FIG. 10A. Although frequency components are included in portions of the output signal circled with the dotted lines, a symmetric emphasis is achieved in the rise and fall. FIG. 21B is a signal diagram of the circuit illustrated in FIG. 20. The frequency components are generated in the portions of the output signal circled with the dashed lines. The emphasis of the rise is small and the emphasis of the fall is large. The offset generating circuit 70 controls the emphasis application method since the desired emphases are different due to the types of loads coupled to the outputs of the emphasis circuit.

In the IIR system emphasis circuit, DC level offsets are generated based on variations in the differential loads and an asymmetric emphasis may be generated. For example, even if the differential loads vary, the DC level offsets may be compensated to make the emphasis symmetrical. As a result, emphasis may be accurately applied to the signals. The IIR system emphasis circuit may achieve substantially the same effects if the FIR system such as that described in Japanese Laid-Open Patent Publication No. 2004-88693 is combined with this configuration.

Figure 22:
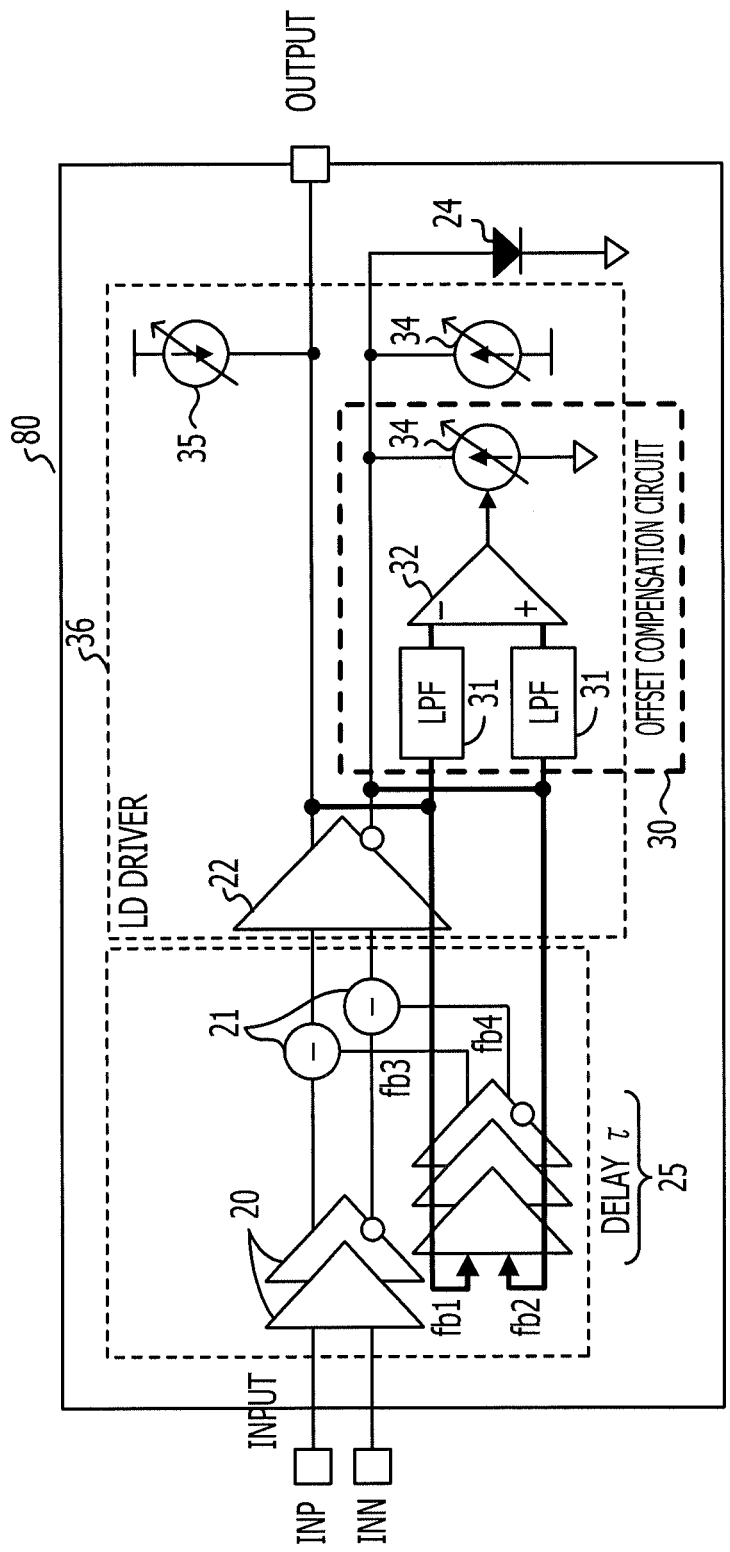
FIG. 22 illustrates an exemplary pre-emphasis driver IC.

FIG. 22 illustrates an exemplary pre-emphasis driver IC. The pre-emphasis driver IC illustrated in FIG. 22 may be an emphasis circuit configured as a sales unit. The positive phase signal INP and the negative phase signal INN are input into the pre-emphasis circuit. The pre-emphasis circuit may be a pre-emphasis driver IC 80 that outputs an output signal on the positive phase signal side. A dummy load 24 corresponding to a load coupled to the output may be included in the pre-emphasis driver IC 80. Another configuration in FIG. 22 may be substantially the same or similar to the configuration illustrated in FIG. 10A. The IC illustrated in FIG. 22 may be configured as a sales unit of the pre-emphasis driver IC 80.

Figure 23:
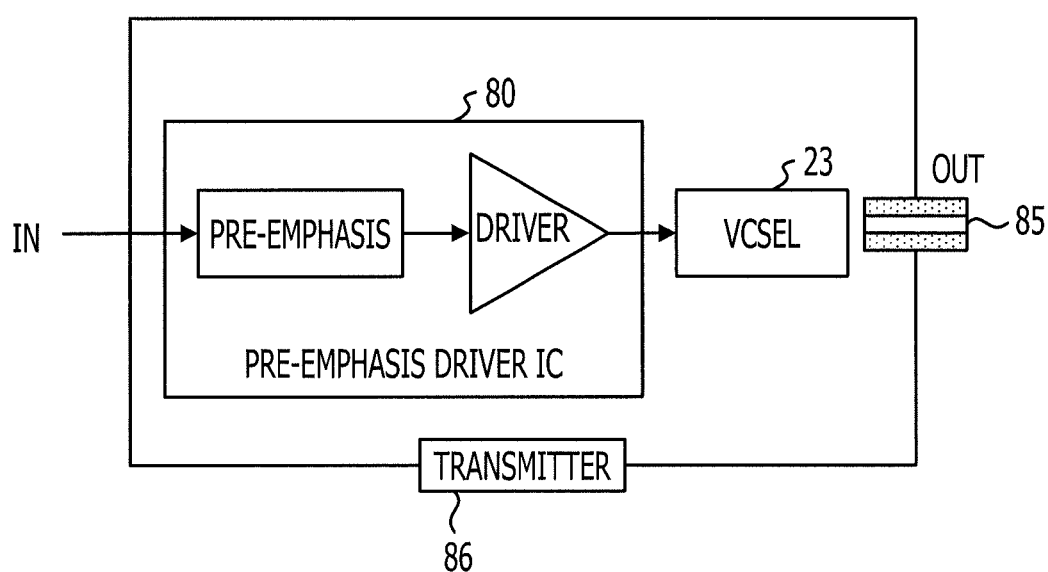
FIG. 23 illustrates an exemplary transmitter.

FIG. 23 illustrates an exemplary transmitter. The transmitter illustrated in FIG. 23 may be a unit for sale. A transmitter 86 includes an emphasis circuit that conducts pre-emphasis, a pre-emphasis driver IC 80 that includes a load driver, and the VCSEL 23 that represents a load. Optical signals output from the VCSEL 23 are transmitted using a fiber 85. The transmitter provided with the pre-emphasis driver IC may be configured as a sales unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An emphasis circuit comprising:
   an applying circuit to add an emphasis signal to an input differential signal;
   a feedback path to feed back a differential output of the applying unit;
   a comparing circuit to compare a direct current component level of a positive phase signal and of a negative phase signal of the differential signal;
   a direct current component level controlling circuit to control a direct current component level of at least one of the positive phase signal and the negative phase signal;

a delay unit circuit to add a delay to at least one of the fed-backed differential signal to generate the emphasis signal and inputs the emphasis signal into the applying unit; and a dummy load coupled to a positive phase signal output or a negative phase signal output of the applying unit.

2. The emphasis circuit according to claim 1, wherein:
the direct current component level controlling circuit controls the direct current component level at least one of the positive phase signal and the negative phase signal so that the direct current component levels of the positive phase signal and the negative phase signal match based on the comparison result.

3. The emphasis circuit according to claim 1, wherein:
the delay unit is provided in the feedback path.

4. The emphasis circuit according to claim 1, wherein:
the feedback path is generated by branching the differential output of the applying unit, a number of the branching is not less than two and each branch includes a feedback path and a delay unit.

5. The emphasis circuit according to claim 1 further comprising:
a standard direct current component level generating circuit to generate a standard direct current component level; wherein,
a fed back signal and the standard direct current component level are input into the direct current component level controlling circuit and the delay circuit.

6. The emphasis circuit according to claim 5, wherein:
the direct current component level controlling circuit controls the direct current component levels of the fed back signal and the standard direct current component level so that direct current component levels match.

7. The emphasis circuit according to claim 5, wherein:
the fed back signal is either the positive phase signal or the negative phase signal of the differential signal.

8. The emphasis circuit according to claim 1, wherein:
the direct current component level controlling circuit controls a variable power source corresponding to the differential signal so that the direct component levels of the differential signal match.

9. The emphasis circuit according to claim 1, wherein:
the direct component levels of the differential signal are compared using a potential based on resistance division.

10. The emphasis circuit according to claim 1 further comprising:
a capacitance coupled to a differential input end of the comparing circuit.

11. The emphasis circuit according to claim 1, further comprising:
an offset generating circuit to generate an offset for a direct current component level.

12. The emphasis circuit according to claim 11, wherein:
the offset generating circuit includes:
a variable power source and
a resistor.

13. A transmitter comprising:
a pre-emphasis driver to include an emphasis circuit that conducts pre-emphasis and a driver; and
a load coupled to an output of the pre-emphasis driver; wherein,
the pre-emphasis driver includes:
an applying circuit to add an emphasis signal to an input differential signal;
a feedback path to feed back a differential output of the applying unit;
a comparing circuit to compare a direct current component level of a positive phase signal and of a negative phase signal of the differential signal;
a direct current component level controlling circuit to control a direct current component level of at least one of the positive phase signal and the negative phase signal;
a delay unit circuit to add a delay to at least one of the fed-backed differential signal to generate the emphasis signal and inputs the emphasis signal into the applying unit; and
a dummy load coupled to a positive phase signal output or a negative phase signal output of the applying unit.

14. The transmitter according to claim 13, further comprising:
a transmission path to output a signal output from the load.

* * * * *